United States Patent
Bian et al.

(10) Patent No.: US 6,852,430 B2
(45) Date of Patent: Feb. 8, 2005

(54) MAGNETIC THIN FILM MEDIA WITH A PRE-SEED LAYER OF CRTI

(75) Inventors: Xiaoping Bian, San Jose, CA (US); Mary Frances Doerner, Santa Cruz, CA (US); James A. Hagan, Rochester, NY (US); Tim Minvielle, San Jose, CA (US); Mohammad Taghi Mirzamaani, San Jose, CA (US); Adam Daniel Polcyn, San Jose, CA (US); Kai Tang, San Jose, CA (US)

(73) Assignee: Hitachi Global Storage Technologies Netherlands, B.V., Amsterdam (NL)

(*) Notice: Subject to any disclaimer, the term of this patent is extended or adjusted under 35 U.S.C. 154(b) by 202 days.

(21) Appl. No.: 10/059,780

(22) Filed: Jan. 29, 2002

(65) Prior Publication Data

US 2003/0008178 A1 Jan. 9, 2003

Related U.S. Application Data

(63) Continuation-in-part of application No. 09/798,235, filed on Mar. 2, 2001, now Pat. No. 6,593,009.

(51) Int. Cl.[7] .............................. G11B 5/66; G11B 5/70
(52) U.S. Cl. ............................... 428/694 TS; 428/336; 428/694 SG; 428/694 ST; 428/900
(58) Field of Search .................... 428/694 TS, 694 TM, 428/694 SG, 336, 900, 694 ST

(56) References Cited

U.S. PATENT DOCUMENTS

| | | | |
|---|---|---|---|
| 5,693,426 A | 12/1997 | Lee et al. | 428/611 |
| 5,789,056 A | 8/1998 | Bian et al. | |
| 5,879,783 A | 3/1999 | Chang et al. | |

(List continued on next page.)

FOREIGN PATENT DOCUMENTS

| JP | 60076016 | 4/1985 |
|---|---|---|
| JP | 363187416 | 8/1988 |
| JP | 11110733 | 4/1999 |
| JP | 11232630 | 8/1999 |
| JP | 11328646 | 11/1999 |
| JP | 2000-020936 | 1/2000 |

OTHER PUBLICATIONS

T.D.Lee, et al. "A Double Underlayer for Co–Based Longitudinal Recording Thin Film Media," IEEE Transactions on Magnetics, vol. 35, No. 5, Sep. 1999, pp. 2628ff.

T.P.Nolan, et al., "Independent Optimization of Nucleation and Growth Processes of Titanium–alloy Underlayers for Cobalt–alloy Perpendicular Recording Media," Materials Research Soc. Symp. Process. vol. 403, 1996, pp. 713ff.

(List continued on next page.)

*Primary Examiner*—Holly Rickman
(74) *Attorney, Agent, or Firm*—G. Marlin Knight

(57) ABSTRACT

A thin film magnetic media structure with a pre-seed layer of CrTi is disclosed. The CrTi pre-seed layer presents an amorphous or nanocrystalline structure. The preferred seed layer is RuAl for use with the CrTi pre-seed layer. The use of the CrTi/RuAl bilayer structure provides superior adhesion to the substrate and resistance to scratching, as well as, excellent coercivity and signal-to-noise ratio (SNR) and reduced cost over the prior art. One embodiment of the invention sputter-deposits a CrTi pre-seed layer and a RuAl seed layer followed by at least one underlayer and at least one magnetic layer on a circumferentially polished substrate structure to achieve an Mrt orientation ratio greater than one. Two methods according to the invention allow the Mrt orientation ratio of the disk to be adjusted or maximized by varying the thickness of the RuAl seed layer and/or altering the atomic percentage of titanium in the pre-seed layer.

9 Claims, 7 Drawing Sheets

U.S. PATENT DOCUMENTS

| | | | |
|---|---|---|---|
| 5,922,456 A | | 7/1999 | Tanahashi et al. |
| 5,993,956 A | | 11/1999 | Lambeth et al. |
| 6,001,447 A | | 12/1999 | Tanahashi et al. |
| 6,077,586 A | | 6/2000 | Bian et al. |
| 6,077,603 A | | 6/2000 | Zhang |
| 6,143,388 A | | 11/2000 | Bian et al. |
| 2003/0017370 A1 | * | 1/2003 | Shimizu et al. ...... 428/694 TM |
| 2003/0091868 A1 | * | 5/2003 | Shimizu et al. ...... 428/694 TM |
| 2003/0134153 A1 | * | 7/2003 | Lee et al. ............. 428/694 BR |
| 2003/0152810 A1 | * | 8/2003 | Kawai et al. ............... 428/695 |

OTHER PUBLICATIONS

T.Kanbe, et al., "Effects of underlayer grain size on the microstructure of the magnetic layer in CoCrPt media," IEEE Transactions on Magnetics, vol. 35, No. 5, Sep. 1999, pp. 2667ff.

M.Mirzamaani, et al., "Recording Performance of Thin Film Media With Various Crystallographic Preferred Orientations on Glass Substrates," IEEE Transactions on Magnetics, vol. 34, No. 4, Jul. 1998, pp. 1588ff.

L.Lee, et al., "Seed layer induced (002) crystallographic texture in NiAl underlayers," J. Appl. Physical. 79(8). Apr. 15, 1996.

* cited by examiner

MAGNETIC THIN FILM MEDIA WITH A PRE-SEED LAYER OF CRTI

RELATED APPLICATIONS

This application is a continuation-in-part of commonly assigned application bearing Ser. No. 09/798,235 filed on Mar. 2, 2001, now U.S. Pat. No. 6,593,009. commonly assigned U.S. patent application bearing Ser. No. 10/010,785 filed on Nov. 9, 2001 now U.S. Pat. No. 6,567,236, describes an antiferromagnetically coupled (AFC) thin film layer structure which includes a pre-seed layer of CrTi. commonly assigned U.S. patent applications bearing Ser. Nos. 09/295,267 now abandoned, and Ser. No. 09/547,439 now abandoned, describe the use of a RuAl seed layer with a B2 crystallographic structure to obtain an underlayer with a preferred in-plane orientation of (200) and a cobalt alloy magnetic film with the preferred in-plane orientation of (11$\overline{2}$0). commonly assigned U.S. patent application bearing Ser. No. 09/500,710 now U.S. Pat. No. 6,586,116 describes the use of an amorphous or nanocrystalline CrTa or AlTi as a pre-seed layer.

FIELD OF THE INVENTION

The invention relates to magnetic thin film media and methods for their fabrication and more particularly to magnetic thin film disks having a pre-seed layer and a seed layer prior to an underlayer.

BACKGROUND OF THE INVENTION

A typical prior art head and disk system 10 is illustrated in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded.

The conventional disk 16 consists of a substrate 26 of AlMg with an electroless coating of NiP which has been highly polished. The thin films 21 on the disk 16 typically include a chromium or chromium alloy underlayer which is deposited on the substrate 26. The ferromagnetic layer in the thin films is based on various alloys of cobalt. For example, a commonly used alloy is CoPtCr. Additional elements such as tantalum and boron are often used in the magnetic alloy. A protective overcoat layer is used to improve wearability and corrosion. The three film disk described above is only one of the many possible structures. Various seed layers, multiple underlayers and laminated magnetic films have all been described in the prior art.

In particular, seed layers have been suggested for use with substrate materials such as glass. Typically the seed layer is a relatively thin layer which is the initial film deposited on the substrate and is followed by the underlayer. Materials proposed for use as seed layers include chromium, titanium, tantalum, NiP, MgO, carbon, tungsten, RuAl, AlN, FeAl and NiAl. In U.S. Pat. No. 5,789,056 to Bian, et al., the use of a CrTi seed layer is described. The underlayers mentioned are Cr, CrV and CrTi.

The convention for alloy composition used in this application gives the atomic percentage of an element as a subscript; for example, $CoCr_{31}$ is 31 atomic percent Cr with the balance being Co and $CoPt_{14}Cr_{18}B_8$ is 14 atomic percent Pt, 18 atomic percent Cr and 8 atomic percent B with the balance being Co.

SUMMARY OF THE INVENTION

The applicants disclose a thin film magnetic media structure with a pre-seed layer of CrTi. The CrTi pre-seed layer presents an amorphous or nanocrystalline structure. The preferred seed layer is RuAl for use with the CrTi pre-seed layer. The use of the CrTi/RuAl bilayer structure provides superior adhesion to the substrate and resistance to scratching, as well as, excellent coercivity and signal-to-noise ratio (SNR) and reduced cost over the prior art. One embodiment of the invention sputter-deposits a CrTi pre-seed layer and a RuAl seed layer followed by an underlayer and at least one magnetic layer on a circumferentially polished substrate structure to achieve an Mrt orientation ratio greater than one. Two methods according to the invention allow the Mrt orientation ratio of the disk to be adjusted or maximized by varying the thickness of the RuAl seed layer and/or altering the atomic percentage of titanium in the pre-seed layer.

DETAILED DESCRIPTION OF THE INVENTION AND THE PREFERRED EMBODIMENTS

Figure 1:
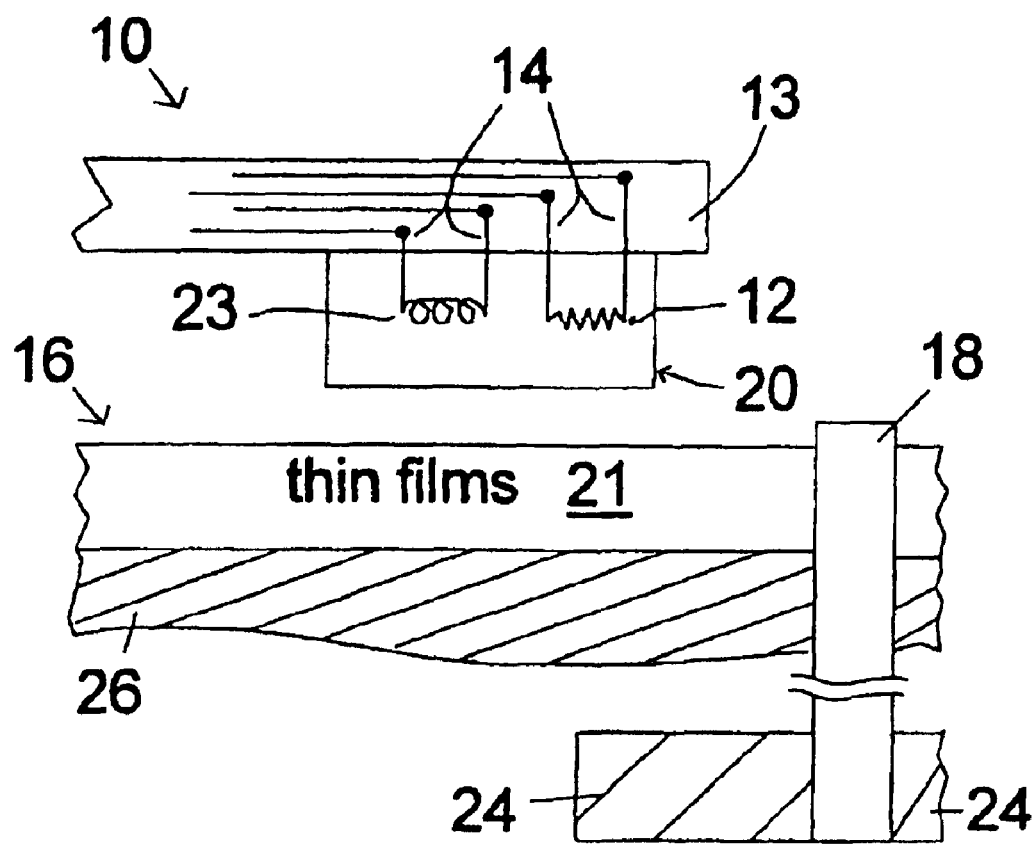
FIG. 1 is a symbolic illustration of the prior art showing the relationships between the head and associated components in a disk drive.
Figure 2:
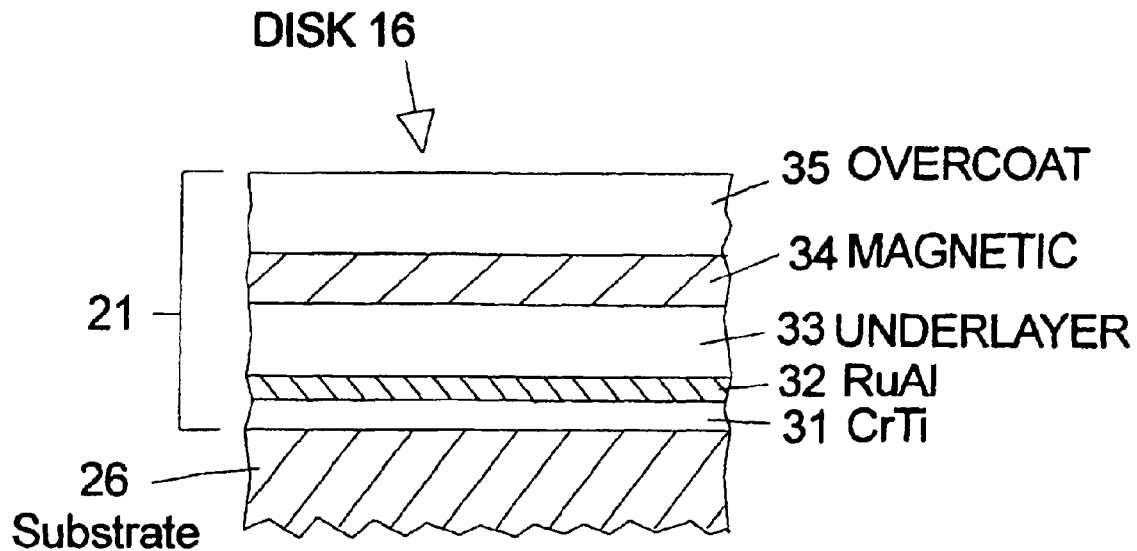
FIG. 2 is an illustration of a layer structure for a magnetic thin film disk according to the invention.
Figure 3:
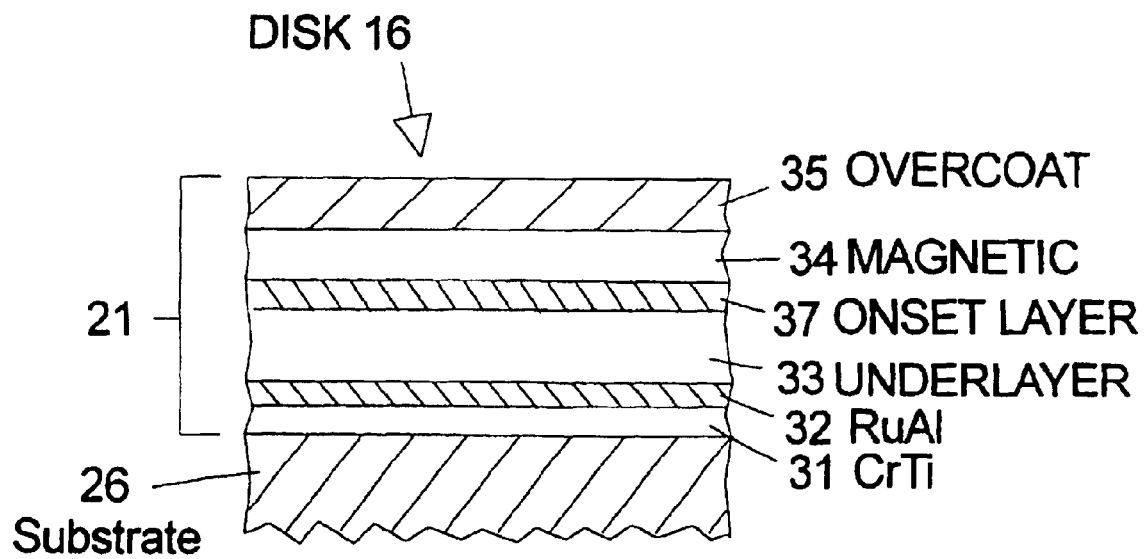
FIG. 3 is an illustration of a layer structure including an onset layer for a magnetic thin film disk according to the invention.

For longitudinal media on glass or other substrates, it is important to control the c-axis in-plane crystallographic orientation and grain size of the magnetic cobalt alloy film. Continued improvements in signal-to-noise ratio (SNR) are also needed to further increase the areal recording density for magnetic media. The pre-seed layer described herein is an amorphous or nanocrystalline layer of CrTi alloy which is preferably followed by a crystalline layer of RuAl. This structure may also be referred to as a CrTi/RuAl bi-layer structure. Reference is made to FIGS. 2 and 3 to illustrate the thin film layers in a magnetic film disk 16 embodying the invention. In the embodiments shown in FIGS. 2 and 3, the CrTi layer 31 is sputter deposited directly onto the substrate surface 26 which may be glass or any other appropriate material or surface.

The CrTi layer 31 also allows the following RuAl layer 32 to be kept very thin, thus saving on the high cost of RuAl. The chromium based underlayer 33 may also be kept very thin when the CrTi pre-seed layer is used. Even though CrTi can be used for both the pre-seed layer 31 and the underlayer 33, the function of each in the thin film structure is different. The CrTi underlayer is crystalline whereas the CrTi pre-seed layer is amorphous or nanocrystalline. The preferred atomic percentage of titanium is also quite different in the pre-seed layer than that of the underlayer as will be noted below.

It is known that the cobalt alloy magnetic films may be grown with the in-plane preferred orientations of (10$\bar{1}$0) or (11$\bar{2}$0) by first depositing an underlayer with a (112) or (200) preferred orientations respectively. Co-pending, commonly assigned U.S. patent applications bearing Ser. Nos. 09/295,267 and 09/547,439 describe the use of a RuAl seed layer with a B2 crystallographic structure to obtain an underlayer with a preferred in-plane orientation of (200) and a cobalt alloy magnetic film with the preferred in-plane orientation of (11$\bar{2}$0). Co-pending, commonly assigned U.S. patent application bearing Ser. No. 09/500,710 describes the use of an amorphous or nanocrystalline CrTa or AlTi as a pre-seed layer, sputter deposited onto a substrate, such as glass, followed by a RuAl seed layer with B2 structure. As stated in the referenced application, a CrTa or AlTi pre-seed layer allows the use of a thinner RuAl seed layer which results in smaller overall grain size, as well as, a reduction in manufacturing costs by saving on the relatively high cost of ruthenium. The resulting increased coercivity also allows use of a thinner Cr alloy underlayer which also contributes to decreased grain size. The use of a pre-seed layer of CrTa or AlTi improves grain size, grain distribution, in-plane crystallographic orientation, coercivity and SNR.

The CrTi pre-seed layer described herein also allows the use of a thinner RuAl seed layer to reduce the overall grain size, as well as, manufacturing costs from reduced use of ruthenium. The use of the CrTi pre-seed layer increases coercivity which then allows use of a thinner Cr alloy underlayer contributing to decreased grain size. As in the case of the CrTa and AlTi pre-seed layers, the use of a pre-seed layer of CrTi improves grain size, grain distribution, in-plane crystallographic orientation, coercivity and SNR.

In addition to providing excellent magnetic and recording performance, the CrTi pre-seed layer improves the mechanical properties. Specifically the adhesion of the thin films to a glass surface is increased and the resistance to scratching is improved. In an extended high speed load/unload test, the resulting scratched area for a disk with the CrTi pre-seed layer of the invention was 75 pixels while a disk with an AlTi pre-seed layer had 120,750 pixels of scratched area. In a test of adhesion to a glass substrate, a disk with the CrTi pre-seed layer of the invention was found to have greater adhesion between the thin films and the substrate than a similar disk with a CrTa pre-seed layer.

A preferred embodiment of the invention in a completed disk includes an onset layer of the type described in U.S. Pat. No. 6,143,388 to Bian, et al. which is commonly assigned with the present application. The onset layer 37 which is illustrated in FIG. 3 is a thin layer between the underlayer 33 and the magnetic layer 34. Onset layer materials include magnetic and nonmagnetic films such as CoCr, CoPtCr, CoPtCrTa and CoPtCrB. A preferred onset layer is $CoCr_{31}$. The preferred magnetic film is CoPtCrB which is generally described in the Doerner, et al. U.S. Pat. No. 5,523,173. The preferred magnetic layer composition in atomic percent is $CoPt_xCr_yB_z$ where:

10<x<16;
14<y<20; and
6<z<12.

The optimum platinum percentage (x) depends on the desired coercivity for the product application.

The preferred thickness for the CrTi pre-seed layer is from 10 nm to 100 nm. The preferred compositional range is from 35 at. % to 55 at. % titanium. The RuAl layer is deposited with a B2 crystallographic structure and has approximately 50 at. % aluminum.

Experimental data on magnetic performance for selected experimental disks 1–9 are given in Tables 1–3. Table 1 compares magnetic and recording performance of disks with different pre-seed layers. These disks have a layer structure of:

pre-seed layer/$RuAl_{50}$/$CrTi_{10}$/$CoCr_{31}$/$CoPt_{14}Cr_{18}B_8$ which corresponds to the embodiment of FIG. 3 with a RuAl seed layer 32, $CrTi_{10}$ underlayer 33, a $CoCr_{31}$ onset layer 37 and a $CoPt_{14}Cr_{18}B_8$ magnetic layer 34. In Table 1 data are shown for two disks according to the invention: disk 1 with a $CrTi_{37}$ pre-seed layer and disk 2 with a $CrTi_{45}$ pre-seed layer. Disks 3 and 4 have $CrTa_{50}$ and $AlTi_{50}$ pre-seed layers respectively. The thickness of each of the pre-seed layers is 43 nm. The data show that the CrTi pre-seed layers of the invention yield comparable SNR and DC SNR to the $CrTa_{50}$ and $AlTi_{50}$ pre-seed layers. The coercivities of the four disks vary from 3588 Oe for the AlTi pre-seed layer disk to 4044 Oe for the $CrTa_{50}$ pre-seed layer disk with the two CrTi pre-seed layer disks falling between these at 3849 Oe and 3843 Oe. This set of data illustrates that the CrTi pre-seed layers have a recording performance comparable to previous state-of-the-art pre-seed layers and acceptable magnetic performance.

Table 2 gives data for disks 5–7 which have a layer structure of:

$CrTi_{37}$/$RuAl_{50}$/$CrTi_{10}$/$CoCr_{31}$/$CoPt_{14}Cr_{18}B_8$ and differ only in the thickness of the $CrTi_{37}$ pre-seed layer. These data indicate the increase in the thickness of the $CrTi_{37}$ pre-seed layer from 20 nm, 43 nm to 71 nm corresponds with dramatic increases in coercivity from 3931 Oe, 4074 Oe to 4303 Oe respectively with little change in Mrt.

Table 3 gives data for disks 8–10 which have a layer structure of:

$CrTi_{45}$/$RuAl_{50}$/$CrTi_{10}$/$CoCr_{31}$/$CoPt_{14}Cr_{18}B_8$ and differ only in the thickness of the $CrTi_{45}$ pre-seed layer. These data indicate the increase in the thickness of the $CrTi_{45}$ pre-seed layer from 20 nm, 43 nm to 71 nm corresponds with increases in coercivity from 3979 Oe, 4154 Oe to 4319 Oe respectively with little change in Mrt.

TABLE 1

| Disk | Pre-Seed Layer | Hc (Oe) | Mrt (memu/cm2) | SNR (dB) | DC SNR (dB) |
|---|---|---|---|---|---|
| 1 | $CrTi_{37}$ | 3849 | 0.316 | 19.4 | 35.0 |
| 2 | $CrTi_{45}$ | 3843 | 0.319 | 19.3 | 34.9 |
| 3 | $CrTa_{50}$ | 4044 | 0.315 | 19.3 | 34.6 |
| 4 | $AlTi_{50}$ | 3588 | 0.325 | 19.4 | 35.2 |

TABLE 2

| Disk | Pre-Seed Layer | Thickness (nm) | Hc (Oe) | Mrt (memu/cm2) |
|---|---|---|---|---|
| 5 | $CrTi_{37}$ | 20 | 3931 | 0.356 |
| 6 | $CrTi_{37}$ | 43 | 4074 | 0.352 |
| 7 | $CrTi_{37}$ | 71 | 4303 | 0.358 |

TABLE 3

| Disk | Pre-Seed Layer | Thickness (nm) | Hc (Oe) | Mrt (memu/cm2) |
|---|---|---|---|---|
| 8 | $CrTi_{45}$ | 20 | 3979 | 0.363 |
| 9 | $CrTi_{45}$ | 43 | 4154 | 0.359 |
| 10 | $CrTi_{45}$ | 71 | 4319 | 0.357 |

Figure 5:
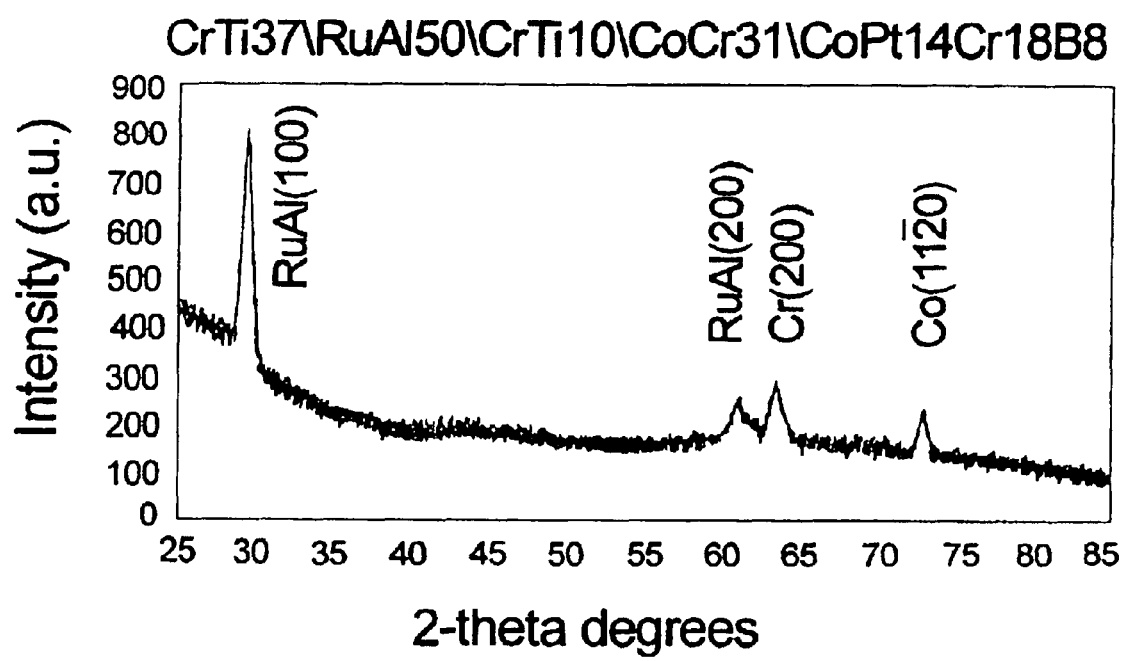
FIG. 5 is an x-ray diffraction plot for a thin film disk structure including a pre-seed layer of $CrTi_{37}$ and a seed layer of $RuAl_{50}$ according to the invention.

X-ray diffraction data for a thin film disk according to the invention is shown in FIG. 5. The layer structure is:

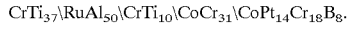

$CrTi_{37} \backslash RuAl_{50} \backslash CrTi_{10} \backslash CoCr_{31} \backslash CoPt_{14}Cr_{18}B_8$.

Figure 6:
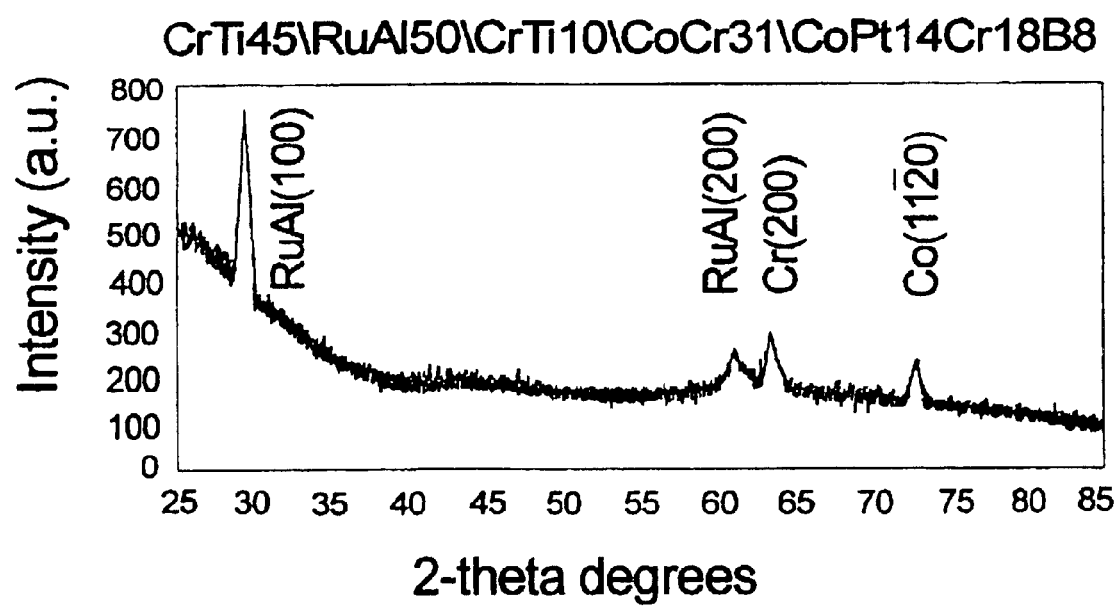
FIG. 6 is an x-ray diffraction plot for a thin film disk structure including a pre-seed layer of $CrTi_{45}$ and a seed layer $RuAl_{50}$ according to the invention.

FIG. 6 shows x-ray diffraction data for a second disk with a $CrTi_{45}$ pre-seed layer and otherwise identical layers with the disk of FIG. 5. Both disks show strong diffraction peaks of (200) of the RuAl seed layer, (200) of the $CrTi_{10}$ underlayer and (11$\bar{2}$0) of the cobalt alloy magnetic layer. These indicate good in-plane orientation which is desirable for longitudinal magnetic recording. The x-ray diffraction data also show no obvious peaks which could be attributed to the CrTi pre-seed layer and, therefore, indicate that the CrTi pre-seed layer is amorphous or nanocrystalline.

Figure 4:
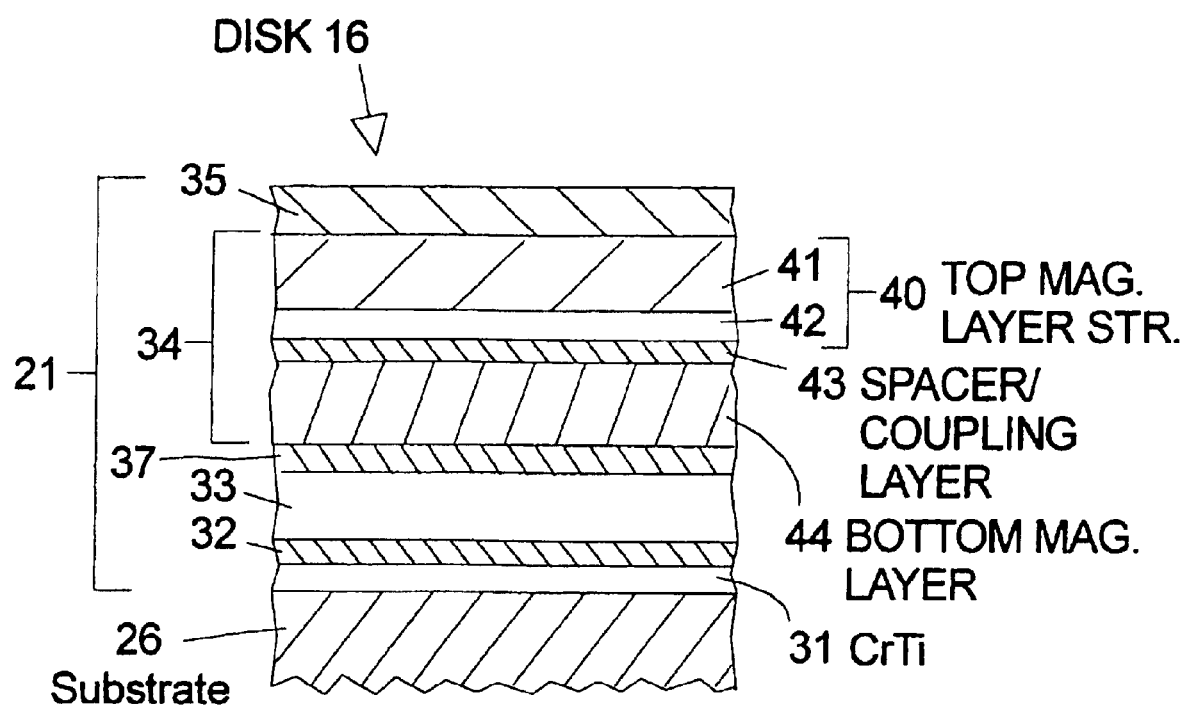
FIG. 4 is an illustration of a layer structure for a magnetic thin film disk according to the invention including antiferromagnetically coupled magnetic layers.

FIG. 4 illustrates the layer structure 21 of a thin film magnetic disk 16 according to the invention which includes antiferromagnetically coupled magnetic layers. The layers under the underlayer 33 may be any of several combinations of seed layers 32 and pre-seed layers 31 as noted in more detail below. The applicants' most preferred structure includes a pre-seed layer of $CrTi_{50}$, a seed layer of RuAl (B2 crystal structure) and a $CrTi_{10}$ underlayer. The substrate 26 can be any prior art substrate material with glass being preferred.

The magnetic layer stack 34 is composed of a plurality of layers. An antiferromagnetically coupled magnetic layer stack 34 has at least three distinct layers. The bottom magnetic layer 44 is a ferromagnetic material of the type used in the prior art of thin film disks. The thickness of the bottom magnetic layer 44 must be chosen in relation to the thickness of the top magnetic layer structure 40 as indicated above, but 10–30 Angstroms is a preferred range. The coupling/spacer layer 43 is a nonmagnetic material with a thickness that is selected to antiferromagnetically couple the top magnetic layer structure 40 with the bottom magnetic layer 44. Ruthenium is the preferred material for the coupling/spacer layer 43, but the prior art indicates that suitable materials include chromium (Cr), rhodium (Rh), iridium (Ir), copper (Cu), and their alloys. The thickness of the exchange/spacer layer 43 is according to the prior art; for example, approximately 6 Angstroms is a preferred target thickness for a ruthenium coupling/spacer layer 43. The top magnetic layer structure 40 can be one layer of ferromagnetic material with CoPtCrB being preferred. A bilayer structure of two distinct ferromagnetic materials can also be used for the top magnetic layer structure 40 to increase the antiferromagnetic exchange coupling. The interface (first) sublayer 42 is a thin layer of material with a relatively high moment, that is, a moment higher than the second sublayer. The preferred materials for the interface sublayer 42 are CoCr, CoCrB and CoPtCrB. The preferred thickness is approximately 3–15 Angstroms. The interface sublayer material is selected to have a higher magnetic moment than the second sublayer. As is known in the art, the moment of the cobalt alloys is decreased in varying degrees by the amounts of the alloying elements, e.g., platinum, chromium and boron, that are included. Therefore, even though the first and second sublayers may contain the same elements, the atomic percentages will be different to achieve the goal of a higher moment in the first sublayer. Another design uses two or more magnetic layers separated by nonmagnetic spacer layers such as ruthenium as the magnetic layer structure 40 to further improve magnetic performance of the media. The magnetic layers can be antiferromagnetically coupled or not coupled.

An additional advantage of the CrTi pre-seed layer is that it promotes a relatively high Mrt orientation ratio when sputter deposited on a circumferentially polished (textured) substrate with the appropriate subsequent thin film structure. An orientation ratio for a magnetic disk for a specific parameter is defined as the ratio of the value of the parameter measured in the circumferential direction over the value measured in the radial direction. The use and benefits of an orientation ratio greater than one are known in the prior art, as is the relationship between orientation ratio and circumferential texture. The use of an orientation ratio greater than one on otherwise similar disks can result in a higher DC SNR, as well as, a lower recording error rate. As will be seen below, circumferential texture alone is insufficient to produce an orientation ratio greater than one, but circumferential texture is contributing factor. A circumferential texture for a magnetic disk is typically achieved by rotationally polishing a smooth substrate with an abrasive slurry. The details of the polishing process and the geometry of the "grooves" are known in the art, but as an example the $R_q$ of a practical textured disk would be on the order of 2–20 angstroms. The density of the resulting "grooves" should be 5000/mm or higher.

The fact that the embodiment of the invention described above has a (11$\bar{2}$0) preferred orientation allows it to be used with circumferentially textured disks to achieve an Mrt orientation ratio greater than one.

In experiments conducted by the applicants, the $CrTi_{50}$ pre-seed layer resulted in a significantly higher Mrt orientation ratio than pre-seed layers of Cr, $CrW_{10}$, $NiP_{19}$, $CrTa_{50}$ and $AlTi_{50}$ when used with circumferentially polished glass substrates and a subsequent antiferromagnetic coupled layer structure of $RuAl/CrTi_{10}/CoCr_{12}/Ru/CoPt_{13}Cr_{18}B_8$. These results are also applicable to layer structures with conventional magnetic layers with (11$\bar{2}$0) preferred orientation. Therefore, circumferentially textured disks can be used with each of the embodiments described herein.

Figure 7:
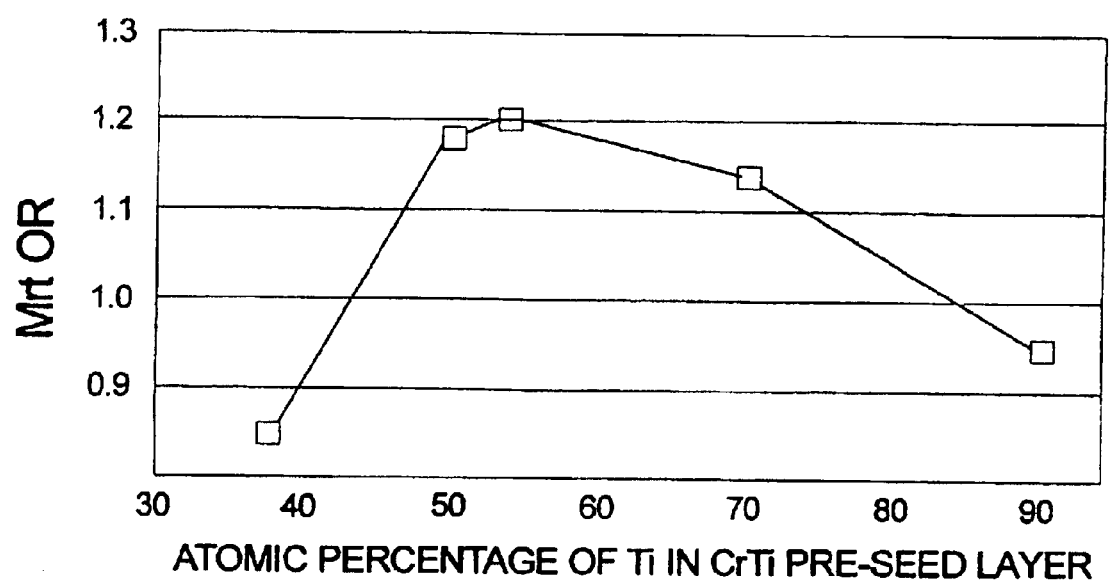
FIG. 7 is a plot of the Mrt orientation ratio of a series of sample glass disks prepared with pre-seed layers of CrTi according to the invention with varying atomic percentages of titanium and an antiferromagnetic coupled layer structure.
Figure 8:
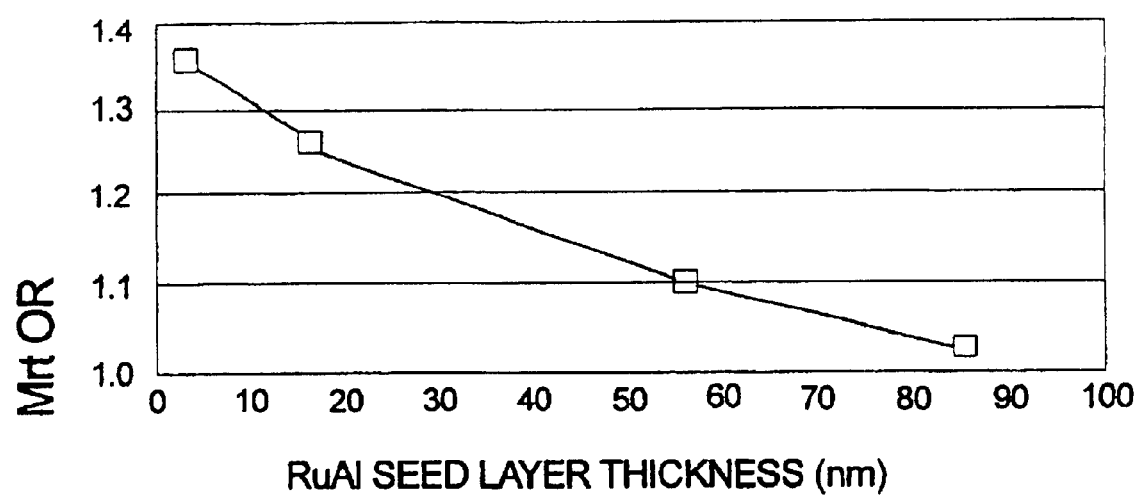
FIG. 8 is a plot of the Mrt orientation ratio of a series of sample glass disks prepared with pre-seed layers of CrTi and RuAl seed layers according to the invention with varying thickness of the RuAl seed layer.

FIG. 7 is a plot of the Mrt orientation ratio of a series of sample glass disks prepared with pre-seed layers of CrTi with varying atomic percentages of titanium and the antiferromagnetic coupled layer structure given above. The conclusion which this data supports is that the Mrt orientation ratio varies significantly with the atomic percentage of titanium. Specifically the orientation ratio goes from approximately 0.85 for 37 at. % Ti to a maximum of 1.2 for 55 at. % Ti and declines to 0.95 for 90 at. % Ti. The data support the conclusion that titanium percentages between approximately 43 at. % and 85 at. % would result in an orientation ratio greater than one. Therefore, the orientation ratio can be adjusted by varying the atomic percentage of Ti in the CrTi pre-seed layer. FIG. 8 is a plot of the Mrt orientation ratio of a series of sample disks on circumferentially textured glass substrates with RuAl seed layers of varying thickness. The thin film structure for each disk is:

$$CrTi_{50}/RuAl/CrTi_{10}/CoCr_{10}/Ru/CoPt_{12}Cr_{18}B_8.$$

The conclusion which this data supports is that the Mrt orientation ratio increases significantly with decreases in the RuAl seed layer thickness. The RuAl seed layer can be made sufficiently thick to reduce the Mrt orientation ratio to approximately one, but thinner RuAl layers resulted in orientation ratios greater than one.

The magnetic media with CrTi/RuAl bilayer can also have Mrt orientation ratios greater than one when sputter-deposited on circumferentially textured substrates other than glass. The applicants have fabricated a disk with an Mrt orientation ratio of 1.29 on a AlMg/NiP substrate with a thin film structure of:

$$CrTi_{50}/RuAl/CrTi_{10}/CoCr_{10}/Ru/CoPt_{11}Cr_{20}B_7.$$

The NiP film is applied to AlMg substrates by an electroless process and is then circumferentially textured. It can be expected that the Mrt orientation ratio of disks on circumferentially textured AlMg/NiP or other substrate material with the CrTi/RuAl bilayer will vary with titanium composition in the CrTi pre-seed layer and with the RuAl thickness as indicated for glass substrates.

One advantage to using the CrTi/RuAl bilayer in conjunction with AlMg/NiP substrates is that the Mrt orientation ratio and recording performance of the magnetic media is insensitive to the time between sputter-deposition and substrate pre-wash. This is unlike prior art disks made with AlMg/NiP substrates with CrX underlayers sputter-deposited directly onto the NiP surface which have decreasing recording performance with increasing time between substrate pre-wash and sputter-deposition.

The atomic percentage compositions given above are given without regard for the small amounts of contamination that invariably exist in sputtered thin films as is well known to those skilled in the art.

The invention has been described with respect to particular embodiments, but other uses and applications will be apparent to those skilled in the art.

What is claimed is:

1. A magnetic thin film disk comprising:
    a circumferentially textured AlMg/NiP substrate structure;
    a layer of CrTi deposited on the substrate;
    a seed layer of RuAl with a B2 crystallographic structure over the layer of CrTi;
    an underlayer over the seed layer; and
    at least one magnetic layer over the underlayer, the magnetic layer having an Mrt orientation ratio greater than one and having a crystallographic orientation with c-axis in-plane for longitudinal recording.

2. The magnetic thin film disk of claim 1 wherein the CrTi layer has from 35 to 90 at. % Ti.

3. The magnetic thin film disk of claim 1 wherein the has from 43 to 85 at % Ti.

4. The magnetic thin film disk of claim 1 wherein the CrTi layer is amorphous or nanocrystalline.

5. The magnetic thin film disk of claim 4 wherein the CrTi is approximately from 10 to 100 nm thick.

6. The magnetic thin film disk of claim 1 wherein the circumferentially textured AlMg/NiP substrate structure has an $R_q$ from 2 to 20 angstroms.

7. The magnetic thin film disk of claim 1 wherein the Mrt orientation ratio is greater than 1.1.

8. A disk drive comprising:
    a magnetic transducer including a read and a write head;
    a rotatable spindle; and
    a magnetic thin film disk mounted on the rotatable spindle allowing magnetic transitions to be written and read on the magnetic thin film disk by the magnetic transducer, the magnetic thin film disk including a circumferentially textured AlMg/NiP substrate structure, including an amorphous or nanocrystalline pre-seed layer of CrTi with 35 to 90 at. % titanium, a seed layer of RuAl with a B2 crystallographic structure on the pre-seed layer of CrTi, at least one underlayer on the seed layer, at least one magnetic layer above the underlayer and the magnetic thin film disk having an Mrt orientation ratio greater than one and having a crystallographic orientation with c-axis in-plane for longitudinal recording.

9. The disk drive of claim 8 wherein the circumferentially textured AlMg/NiP substrate has an $R_q$ from 2 to 20 angstroms.

* * * * *

UNITED STATES PATENT AND TRADEMARK OFFICE
CERTIFICATE OF CORRECTION

| | | |
|---|---|---|
| PATENT NO. | : 6,852,430 B2 | Page 1 of 1 |
| APPLICATION NO. | : 10/059780 | |
| DATED | : January 29, 2002 | |
| INVENTOR(S) | : Bian et al. | |

It is certified that error appears in the above-identified patent and that said Letters Patent is hereby corrected as shown below:

Claim 1, line 4 should read:

--a seed layer of RuAl with a B2 crystallographic structure over the layer of CrTi;--

Claim 3, should read:

--3. The magnetic thin film disk of claim 1 wherein the CrTi layer has from 43 to 85 at % Ti.--

Signed and Sealed this

Twelfth Day of February, 2008

JON W. DUDAS
*Director of the United States Patent and Trademark Office*

UNITED STATES PATENT AND TRADEMARK OFFICE
CERTIFICATE OF CORRECTION

PATENT NO.         : 6,852,430 B2                                          Page 1 of 1
APPLICATION NO. : 10/059780
DATED              : February 8, 2005
INVENTOR(S)        : Bian et al.

It is certified that error appears in the above-identified patent and that said Letters Patent is hereby corrected as shown below:

Claim 1, Column 8, lines 9 and 10 should read:

--a seed layer of RuAl with a B2 crystallographic structure over the layer of CrTi;--

Claim 3, Column 8, lines 19 and 20 should read:

--3. The magnetic thin film disk of claim 1 wherein the CrTi layer has from 43 to 85 at % Ti.--

This certificate supersedes the Certificate of Correction issued February 12, 2008.

Signed and Sealed this

Fourth Day of March, 2008

JON W. DUDAS
*Director of the United States Patent and Trademark Office*